(12) United States Patent
Taylor et al.

(10) Patent No.: US 12,544,066 B2
(45) Date of Patent: Feb. 10, 2026

(54) SURGICAL STAPLE IMPLANT SYSTEM

(71) Applicant: In2Bones USA, LLC, Memphis, TN (US)

(72) Inventors: Alan G. Taylor, Memphis, TN (US); Rebecca Hawkins Wahl, Escondido, CA (US)

(73) Assignee: In2Bones USA, LLC, Memphis, TN (US)

( * ) Notice: Subject to any disclaimer, the term of this patent is extended or adjusted under 35 U.S.C. 154(b) by 0 days.

(21) Appl. No.: 16/718,042

(22) Filed: Dec. 17, 2019

(65) Prior Publication Data

US 2021/0128145 A1  May 6, 2021

Related U.S. Application Data

(60) Provisional application No. 62/928,892, filed on Oct. 31, 2019.

(51) Int. Cl.
*A61B 17/064* (2006.01)
*A61B 17/00* (2006.01)
(Continued)

(52) U.S. Cl.
CPC ........ *A61B 17/0642* (2013.01); *A61B 17/076* (2013.01); *A61B 17/10* (2013.01);
(Continued)

(58) Field of Classification Search
CPC . A61B 17/0642; A61B 17/076; A61B 17/068; A61B 17/1775; A61B 17/1782; A61B 17/885; A61B 17/0644; A61B 17/064; A61B 17/68; A61B 17/92; A61B 17/8872; A61B 2017/0645; A61B 2017/0641; A61B 2017/0688; A61B 2017/0409; A61B 2017/411;
(Continued)

(56) References Cited

U.S. PATENT DOCUMENTS 10,893,862 B2 *   1/2021   Wahl ................. A61B 17/0682
2013/0030437 A1   1/2013   Fox
(Continued)

OTHER PUBLICATIONS

PCT Office, Notification of International Search Report dated May 16, 2021.

*Primary Examiner* — Marcela I. Shirsat
(74) *Attorney, Agent, or Firm* — Rutan & Tucker LLP; Hani Z. Sayed (57) ABSTRACT

A sterile staple implant system is provided for use during a surgery. The staple implant system comprises a group of complementary surgery-specific instruments that are packaged in a sterile state. An instrument tray is configured to preserve the instruments in the sterile state until the staple implant system is opened during the surgery. The instrument tray is configured to provide the surgeon with easy access to the instruments during the surgery. The staple implant system comprises at least a staple inserter and a surgical staple suitable for being implanted in parallel holes drilled across a bone fusion or fixation site of a patient. The surgical staple preferably is loaded in a relaxed configuration into the staple inserter. A staple retention clip retains the surgical staple in the staple inserter until the staple is distracted during the surgery.

12 Claims, 10 Drawing Sheets

(51) Int. Cl.
- A61B 17/04 (2006.01)
- A61B 17/068 (2006.01)
- A61B 17/076 (2006.01)
- A61B 17/10 (2006.01)
- A61B 17/16 (2006.01)
- A61B 17/17 (2006.01)
- A61B 17/28 (2006.01)
- A61B 17/80 (2006.01)
- A61B 17/84 (2006.01)
- A61B 17/88 (2006.01)
- A61B 17/82 (2006.01)

(52) U.S. Cl.
CPC ...... *A61B 17/1682* (2013.01); *A61B 17/1686* (2013.01); *A61B 17/17* (2013.01); *A61B 17/28* (2013.01); *A61B 17/80* (2013.01); *A61B 17/84* (2013.01); *A61B 2017/00477* (2013.01); *A61B 2017/00867* (2013.01); *A61B 2017/0409* (2013.01); *A61B 17/064* (2013.01); *A61B 17/0644* (2013.01); *A61B 2017/0645* (2013.01); *A61B 17/068* (2013.01); *A61B 2017/0688* (2013.01); *A61B 17/82* (2013.01); *A61B 17/8872* (2013.01)

(58) Field of Classification Search
CPC .... A61B 2017/412; A61B 2017/00867; A61B 2017/0648; A61F 2/4611; A61F 2002/30841
USPC .................. 606/75, 60, 74, 324, 78, 96, 102
See application file for complete search history.

(56) References Cited

U.S. PATENT DOCUMENTS

| | | | |
|---|---|---|---|
| 2013/0206815 A1* | 8/2013 | Fox | A61B 17/0644 227/176.1 |
| 2013/0213843 A1* | 8/2013 | Knight | A61L 2/26 206/438 |
| 2013/0231667 A1* | 9/2013 | Taylor | A61B 17/8085 606/75 |
| 2016/0338697 A1 | 11/2016 | Biedermann et al. | |
| 2017/0296174 A1 | 10/2017 | Wahl et al. | |
| 2018/0008263 A1 | 1/2018 | Goldstein et al. | |

* cited by examiner

SURGICAL STAPLE IMPLANT SYSTEM

PRIORITY

This application claims the benefit of and priority to U.S. patent application Ser. No. 17/958,134 filed on Sep. 30, 2022 and U.S. patent application Ser. No. 18/114,804 and Mar. 6, 2023 and U.S. Provisional Application, entitled "Surgical Staple Implant System," filed on Oct. 31, 2019 and having application Ser. No. 62/928,892, the entirety of said application being incorporated herein by reference.

FIELD

Embodiments of the present disclosure generally relate to securing bones together. More specifically, embodiments of the disclosure relate to a sterile staple implant system and methods that a surgeon may utilize during bone fusion or fixation surgery.

BACKGROUND

Surgical staples or a fusion bone plate implant utilized in conjunction with one or more fasteners may be used to generate compression and stability at a bone interface. An implant generally serves to stabilize bones, or bone parts, relative to one another so as to promote bone fusion. In many applications, surgical staples, or bone plates and fasteners are used to fuse bones, or bone parts, of the human body, such as bones in the foot, the ankle, the hand, the wrist, as well as various other portions of the body. Surgical staples are particularly advantageous in the hands and feet due to a low dorsal profile of the staples once they are implanted. Furthermore, during the course of certain medical procedures, a surgeon may immobilize one or more bones or bone fragments by stabilizing the bones together in a configuration which approximates the natural anatomy. To this end, the surgeon may use fasteners to attach the bones to a bone plate implant so as to hold the bones in alignment with one another while they fuse together.

SUMMARY

A sterile staple implant system is provided for use during a surgery. The staple implant system comprises a group of complementary surgery-specific instruments that are packaged in a sterile state. An instrument tray is configured to preserve the instruments in the sterile state until the staple implant system is opened during the surgery. The instrument tray is configured to provide the surgeon with easy access to the instruments during the surgery. The staple implant system comprises at least a staple inserter and a surgical staple suitable for being implanted in parallel holes drilled across a bone fusion or fixation site of a patient. In some embodiments, the staple implant system may further include a bone drill, a drill guide, a locator pin, and a tamp. The staple inserter is configured for distracting and implanting the surgical staple at the bone fusion site. The surgical staple preferably is loaded in a relaxed configuration into the staple inserter. A staple retention clip retains the surgical staple in the staple inserter until the staple is distracted during the surgery.

In an exemplary embodiment, a sterile staple implant system for use during a surgery comprises: a staple inserter and a surgical staple; a staple retention clip that retains the surgical staple in the staple inserter; a group of complementary surgery-specific instruments that are packaged in a sterile state; and an instrument tray configured to preserve the instruments in the sterile state and provide easy access to the instruments during the surgery.

In another exemplary embodiment, the staple retention clip is configured to retain the surgical staple in a relaxed state during sterilization, packaging, and shipping. In another exemplary embodiment, the staple retention clip is configured to be removed from the staple inserter during or after distracting the surgical staple prior to being implanted into a bone of a patient. In another exemplary embodiment, the group of instruments comprises at least the staple inserter, the surgical staple, a bone drill, a drill guide, a locator pin, and a tamp. In another exemplary embodiment, the group of instruments further comprises any of various surgical tools, such as drill sizers, forceps, staple removal tools, temporary pins, drill depth stops, fusion bone plates, bone plate fasteners, compression screws, and the like.

In another exemplary embodiment, the surgical staple comprises a crown coupled with a first leg at a first end and coupled with a second leg at a second end, the first leg and the second leg extending obliquely from the crown and toward one another at an acute angle. In another exemplary embodiment, the surgical staple includes a plurality of teeth disposed on the first leg and the second leg, the plurality of teeth being configured to engage with a bone. In another exemplary embodiment, the surgical staple includes wing portions disposed at opposite ends of the crown and extending beyond the first leg and the second leg, the wing portions being configured to cooperate with at least the plurality of teeth to fixate the surgical staple once implanted in the bone. In another exemplary embodiment, the wing portions are configured to receive a first grip and a second grip comprising the staple inserter for placing the surgical staple into a distracted configuration suitable for implantation into a bone. In another exemplary embodiment, the crown includes an upper reinforced portion and a valley disposed underneath the reinforced portion and bordered by edges, the crown being configured to receive a first grip and a second grip comprising the staple inserter for placing the surgical staple into a distracted configuration suitable for implantation into a bone.

In another exemplary embodiment, the surgical staple comprises a crown coupled with a first transverse portion at a first end and coupled with a second transverse portion at a second end, a first leg and a second leg extending downward and parallelly from opposite ends of the first transverse portion, a third leg and a fourth leg extending downward and parallelly from opposing ends of the second transverse portion. In another exemplary embodiment, a plurality of teeth are disposed on each of the first leg, the second leg, the third leg, and the fourth leg and oriented toward a centerline of the crown. In another exemplary embodiment, the staple inserter includes a first grip and a second grip that share a separation distance comparable with the length of the crown. In another exemplary embodiment, the first grip is configured to engage the crown adjacent to the first transverse portion, and the second grip is configured to engage the crown adjacent to the second transverse portion. In another exemplary embodiment, the first grip and the second grip are configured to engage wing portions disposed at opposite ends of the crown and extending beyond the first transverse portion and the second transverse portion, the wing portions being configured to receive the first grip and the second grip for placing the surgical staple into a distracted configuration suitable for implantation into a bone.

In an exemplary embodiment, a staple inserter for distracting and implanting a surgical staple at a bone fusion site of a patient comprises: a body supporting a first grip and a second grip that are configured to retain a crown of the surgical staple; a driver configured to exert a force onto a top of the crown between the first grip and the second grip; a proximal handle configured to move the driver longitudinally relative to the body; and a staple retention clip that retains the surgical staple in the staple inserter.

In another exemplary embodiment, the surgical staple is configured for fixating osteotomies and joint arthrodeses of the hands and feet. In another exemplary embodiment, the first grip and the second grip are configured to engage the crown on the same side of the surgical staple. In another exemplary embodiment, the first grip and the second grip are configured to engage wing portions disposed at opposite ends of the crown for placing the surgical staple into a distracted configuration suitable for implantation into a bone. In another exemplary embodiment, the staple retention clip is configured to retain the surgical staple in a relaxed state during sterilization, packaging, and shipping. In another exemplary embodiment, the staple retention clip is configured to be removed from the staple inserter during or after distracting the surgical staple prior to being implanted into a bone of a patient.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first implant," may be made. However, the specific numeric reference should not be interpreted as a literal sequential order but rather interpreted that the "first implant" is different than a "second implant" Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes a sterile staple implant system that a surgeon may utilize during a surgery. The staple implant system comprises a group of complementary surgery-specific instruments that are packaged in a sterile state. An instrument tray is configured to preserve the instruments in the sterile state until the staple implant system is opened during the surgery. The instrument tray is configured to provide the surgeon with easy access to the instruments during the surgery. The staple implant system comprises at least a staple inserter and a surgical staple suitable for being implanted in parallel holes drilled across a bone fusion or fixation site of a patient. In some embodiments, the staple implant system may further comprise a bone drill, a drill guide, a locator pin, and a tamp. The surgical staple preferably is loaded in a relaxed configuration into the staple inserter. A staple retention clip is configured to retain the surgical staple coupled with the staple inserter until the staple is distracted during the surgery. A staple sizer is provided for determining sizes of surgical staples during the surgery.

Figure 1:
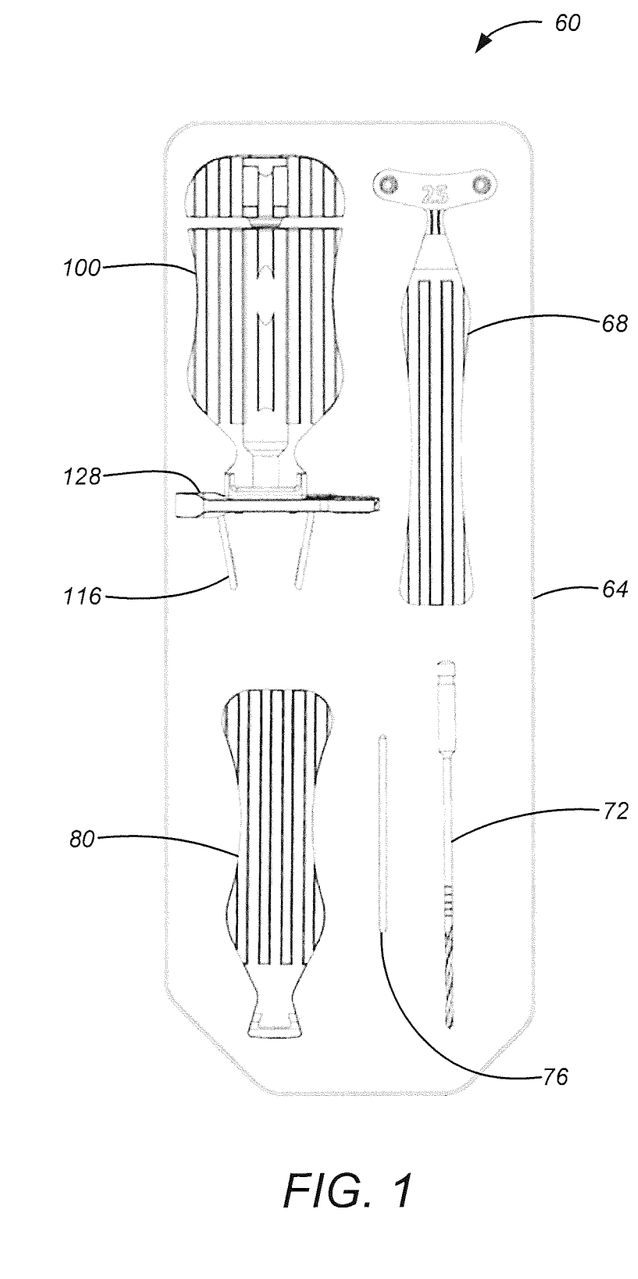
FIG. 1 illustrates a top plan view of an exemplary embodiment of a sterile staple implant system in accordance with the present disclosure.

FIG. 1 illustrates an exemplary embodiment of a sterile staple implant system 60, in accordance with the present disclosure. The sterile staple implant system 60 comprises a group of complementary surgical instruments that are sterilized and packaged together such that a surgeon may unpack and utilize the instruments during a bone fusion surgery. In the embodiment illustrated in FIG. 1, the instruments are supported in an instrument tray 64 that is configured to preserve the instruments in a sterile and undamaged state until the staple implant system 60 is opened by the surgeon during surgery. Further, the instrument tray 64 provides the surgeon with easy access to the instruments during the surgery. In the embodiment of FIG. 1, the staple implant system 60 comprises a drill guide 68, a bone drill 72, a locator pin 76, a tamp 80, and a staple inserter 100. In other embodiments, however, the staple implant system 60 may comprise other surgical tools and components, such as by way of non-limiting example, drill guides, drill sizers, tamps, forceps, staple removal tools, drills, temporary pins, drill depth stops, fusion bone plates, bone plate fasteners, compression screws, and the like.

Figure 2A:
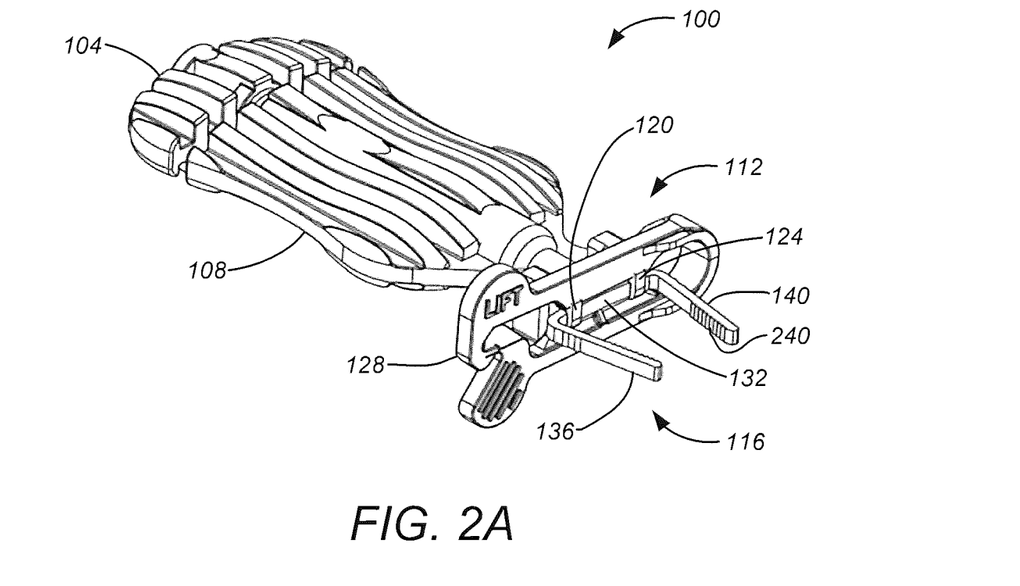
FIG. 2A illustrates a rearward upper perspective view of an exemplary embodiment of a staple inserter in accordance with the present disclosure.
Figure 2B:
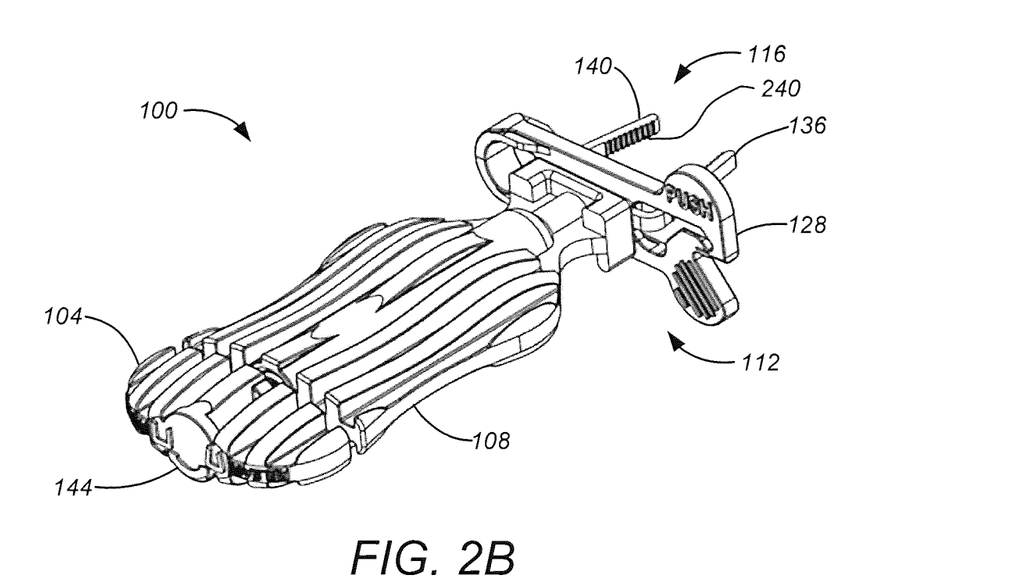
FIG. 2B illustrates a forward upper perspective view of the exemplary embodiment of the staple inserter illustrated in FIG. 2A, according to the present disclosure.

FIGS. 2A and 2B illustrate perspective views of an exemplary embodiment of the staple inserter 100 in accordance with the present disclosure. The staple inserter 100 comprises a proximal handle 104, a body 108, and a distal force applicator 112. In the embodiment illustrated in FIGS. 2A-2B, a surgical staple 116 is shown loaded within the distal force applicator 112, such that the surgical staple 116 is in a relaxed configuration suitable for packaging and shipping of the instrument 100 before being distracted during implantation of the surgical staple 116 at a bone fixation or fusion site of a patient. The surgical staple 116 generally is of a variety indicated for fixation of osteotomies and joint arthrodesis of the hands and feet. As such, the surgical staple 116 preferably is comprised of a metal alloy exhibiting shape memory and superelastic properties, such as Nitinol or other similar material. Further, in some embodiments, multiple teeth suitable for engaging with bone may be disposed on one or more exterior surfaces of the surgical staple 116, such as, for example, along a backspan or crown of the staple. In the embodiment illustrated herein, a multiplicity of teeth are disposed along each of a pair of legs of the surgical staple 116 so as to discourage movement of the staple once implanted in bone. It should be understood, however, that the staple inserter 100 is not to be limited to distracting surgical staples, but rather may be used in various other capacities, such as by way of non-limiting example, bending a bone fusion plate so as to tailor the plate to specific anatomy of a patient's bone being treated.

Figure 3A:
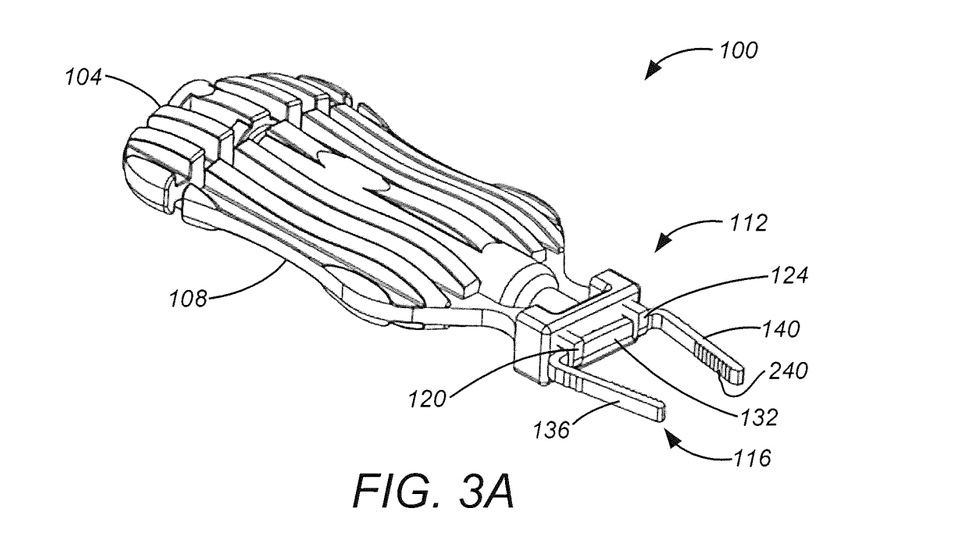
FIG. 3A illustrates a rearward upper perspective view of an exemplary embodiment of a staple inserter, according to the present disclosure.
Figure 3B:
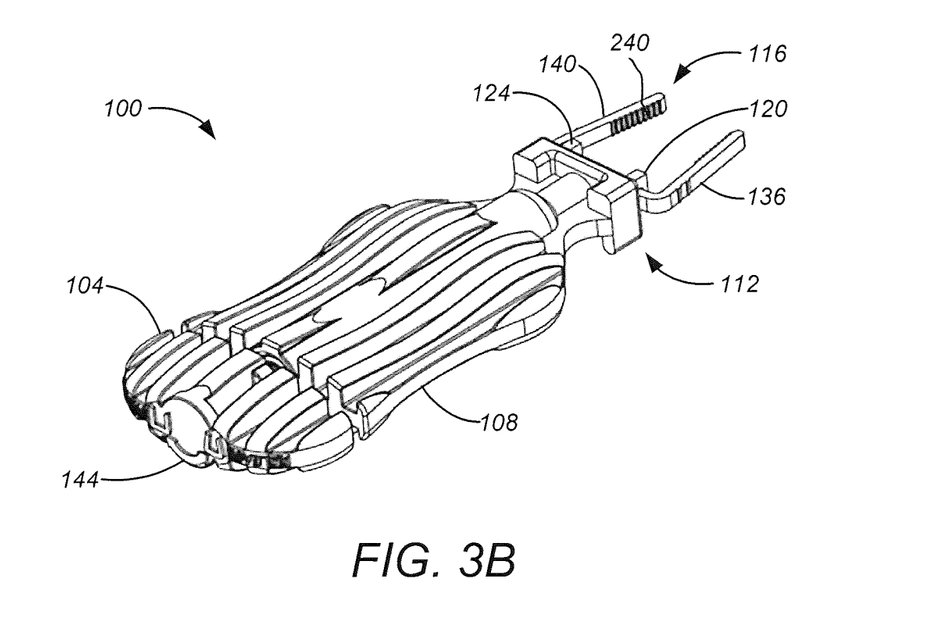
FIG. 3B illustrates a forward upper perspective view of the exemplary embodiment of the staple inserter illustrated in FIG. 3A, according to the present disclosure.

As best illustrated in FIGS. 3A-3B, the distal force applicator 112 comprises a first grip 120, a second grip 124, and a driver (not shown) centered there between. The first and second grips 120, 124 are configured to cooperate so as to support a crown 132 of the surgical staple 116 when the driver is placed into forcible contact with the center of the crown 132. The forces on the crown 132 due to the driver and the grips 120, 124 operate to retain the surgical staple 116 within the distal force applicator 112, thereby facilitating implanting the staple into the patient. As shown in FIG. 3A, the first and second grips 120, 124 engage the surgical staple 116 on the same side of the crown 132. As shown in FIGS. 2A-2B, a staple retention clip 128 prevents the crown 132 from becoming dislodged from the distal forced applicator 112 during packaging, sterilization, and shipping, as well as during distracting of the surgical staple 116, as described herein.

Preferably, the first and second grips 120, 124 have a separation distance comparable with the length of the crown 132. Thus, as illustrated in FIGS. 3A-3B, the first grip 120 is positioned near a first leg 136 of the surgical staple 132, and the second grip 124 is positioned near a second leg 140 of the staple. As will be appreciated, therefore, the distal force applicator 112 of the staple inserter 100 is configured to be used with specific sizes of surgical staples 116. In some embodiments, the staple inserter 100 may be configured with an overall size so as to be used with specific sizes of surgical staples 116. In some embodiments, a color-matching system may be utilized to indicate to the surgeon that certain surgical staples 116 may be implanted by way of the staple inserter 100. Further, in some embodiments, the first and second grips 120, 124 may have an adjustable separation distance so as to facilitate using the staple inserter 100 with a variety of differently sized staples.

In the illustrated embodiment, the proximal handle 104 is mechanically coupled with the driver by way of a shaft that extends through the body 108. At least a portion of the shaft may comprise a threaded portion that rotatably engages with similar threads within a hole extending longitudinally through the body 108. In some embodiments, the driver may comprise a distal extension of the shaft, having a narrower diameter than proximal portions of the shaft. In some embodiments, the driver and the shaft may be separate components that are engaged with one another. The shaft generally is fixedly coupled with the proximal handle 104 such that rotating the proximal handle 104 relative to the body 108 rotates the shaft within the body 108, and thus moves the driver longitudinally relative to the body and the crown 132. Further, the proximal handle 104 may comprise a directional indicator 144 that indicates to the surgeon directions to rotate the proximal handle to distract and relax the surgical staple 116. In the illustrated embodiment, rotating the proximal handle 104 clockwise, as viewed from the perspective of a surgeon operating the instrument 100, distracts the surgical staple 116, and rotating the proximal handle counterclockwise relaxes the surgical staple.

When the driver is not in contact with the crown 132, or the contact is minimal, the surgical staple 116 is in an initial, relaxed configuration wherein the first leg 136 and the second leg 140 of the staple bend toward one another. The staple retention clip 128 serves to keep the crown 132 fixedly engaged with the grips 120, 124, as shown in FIGS. 2A-2B. As shown in FIG. 1, the staple inserter 100 preferably is stored in the staple implant system 60 with the surgical staple 116 in the relaxed configuration and engaged with the grips 120, 124 by way of the staple retention clip 128. Thus, the staple implant system 60 removes the burden, on the surgeon, of locating and loading a suitably sized staple onto an appropriate bending instrument, thereby allowing the surgeon to focus attention on other important aspects of the surgery.

During operation of the staple inserter 100, twisting the proximal handle 104 clockwise, as disclosed above, advances the shaft and moves the driver distally toward the crown 132. Once the driver contacts the center of the crown 132, the surgical staple 116 becomes clasped between the grips 120, 124 and the driver, at which point the staple retention clip 128 may be removed from the distal force applicator 112. Further clockwise twisting of the proximal handle 104 exerts an increasing degree of force onto the crown 132 by the grips 120, 124 and the driver. As will be appreciated, the distally directed force due to the driver and proximally-directed forces due to the grips 120, 124 cause a corresponding distraction of the first and second legs 136, 140. Thus, clockwise twisting of the proximal handle 104 enables the surgeon to change the surgical staple 116 from the initial, relaxed configuration, shown in FIGS. 2A-2B, to a distracted configuration wherein the first and second legs 136, 140 are forced into a parallel relationship suitable for implanting the surgical staple 116 into a patient.

Once the surgical staple 116 is in the distracted configuration, and the staple retention clip 128 has been removed, the surgeon may use the staple inserter 100 to slide the first and second legs 136, 140 into parallel holes drilled across a bone fusion or fixation site of the patient. It will be appreciated that the forces exerted onto the crown 132 by the grips 120, 124 and the driver maintain the distracted configuration of the surgical staple 116 during implantation. The surgeon may insert the first and second legs 136, 140 into the parallel holes until the first and second grips 120, 124 come into contact with the patient's bone. The surgeon may then twist the proximal handle 104 counterclockwise so as to retract the driver proximally away from the crown 132, thereby allowing the surgical staple 116 to relax from the distracted configuration. The shape memory and superelastic properties of the material comprising the surgical staple 116 ensure that the staple advantageously compresses the bones to be fused as the staple attempts to return to the initial configuration illustrated in FIGS. 3A-3B. Once the driver has been suitably retracted from the crown 132, the surgeon may disengage the first and second grips 120, 124 from the crown 132 and then use the tamp 80 to push the legs 136, 140 into the parallel holes until the crown 132 is in direct contact with the bone. The surgeon may then close the incision by way of suturing.

As disclosed with respect to FIG. 1, the staple implant system 60 preferably comprises other surgical instruments that may assist the surgeon with using the staple inserter 100 and the surgical staple 116. In the illustrated embodiment, the staple inserter 100 and the surgical staple 116 are accompanied by the drill guide 68, the bone drill 72, the locator pin 76, and the tamp 80. In other embodiments, however, additional surgical instruments may be included in the staple implant system 60, such as, by way of non-limiting example, drill sizers, forceps, staple removal tools, drill depth stops, fusion bone plates, bone plate fasteners, compression screws, and the like.

Figure 4:
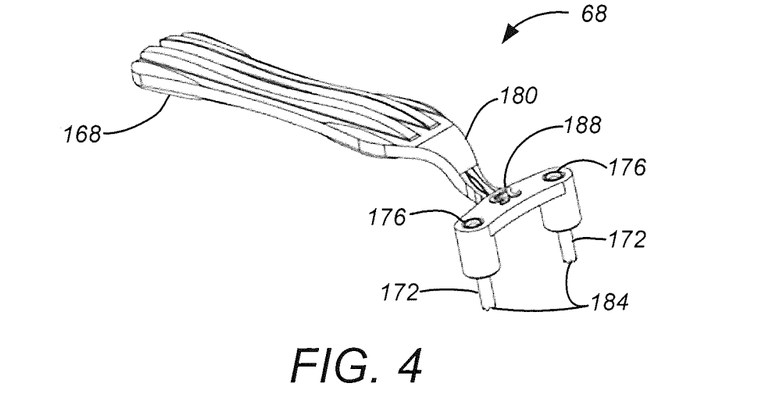
FIG. 4 illustrates an upper perspective view of an exemplary embodiment of a bone drill guide, according to the present disclosure.

FIG. 4 is a perspective view illustrating an exemplary embodiment of the drill guide 68 that may be included in the staple implant system 60, according to the present disclosure. The drill guide 68 is a generally elongate member comprising a proximal handle 168 and a pair of parallel sleeves 172 configured to assist the surgeon with drilling osteotomy holes across a bone fusion or fixation site of a patient. An opening 176 into each of the parallel sleeves 172 is configured to receive the bone drill 72 and guide the drill into the interior of the sleeve. An angled portion 180 of the drill guide 68 is configured to facilitate simultaneously grasping the proximal handle 168 and drilling the osteotomy holes by way of the parallel sleeves 172. Distal teeth 184 disposed on the parallel sleeves 172 are configured to grip the bone of the patient and reduce movement of the drill guide 68 relative to the bone during drilling the osteotomy holes.

In the embodiment illustrated in FIG. 4, the drill guide 68 comprises a size indicator 188 disposed between the openings 176. The size indicator 188 corresponds to the distance between the positions of osteotomy holes that may be drilled by way of the drill guide 68. As will be recognized, the drill guide 68 aides the surgeon with preparing optimally positioned osteotomy holes for receiving the first and second legs 136, 140 in the distracted state of the surgical staple 116. As such, the size indicator 188 readily conveys to the surgeon the size of the surgical staple 116 that may be inserted into osteotomy holes created with the drill guide 68. It should be understood, however, that as members of the staple implant system 60, illustrated in FIG. 1, the surgical staple 116 and drill guide 68 included in the system preferably share complementary sizes. Thus, the drill guide 68 included in the staple implant system 60 has a size that advantageously aides the surgeon with implanting the particular surgical staple 116 that is included in the system. Further, in some embodiments, the size indicator 188 may include additional size-related information, such as information about the diameter of the sleeves 172, sizes of compatible drills, depth of the sleeves, and the like.

Figure 5:
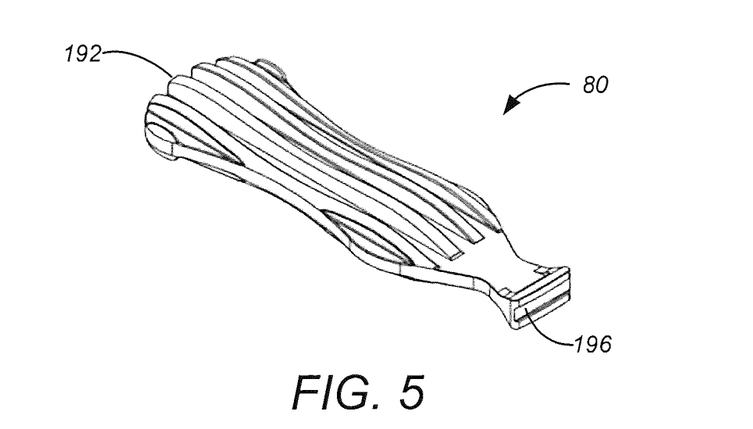
FIG. 5 illustrates a perspective view of an exemplary embodiment of a tamp in accordance with the present disclosure.

FIG. 5 is a perspective view illustrating an exemplary embodiment of the tamp 80 that may be included in the staple implant system 60, in accordance with the present disclosure. The tamp 80 is a generally elongate member comprising a proximal handle 192 and a distal recess 196. As will be recognized, the tamp 80 advantageously enables the surgeon to push the legs 136, 140 into parallel osteotomy holes until the crown 132 is in direct contact with the bone of the patient. To this end, the distal recess 196 comprises a depth and a width configured to receive substantially an entirety of the crown 132. The proximal handle 192 is configured for grasping the tamp 80 during pushing of the crown 132 by way of the distal recess 196. In some embodiments, the tamp 80 may include a size indicator configured to display one or more sizes of the surgical staple 116 for which the tamp 80 is best suited.

Figure 6:
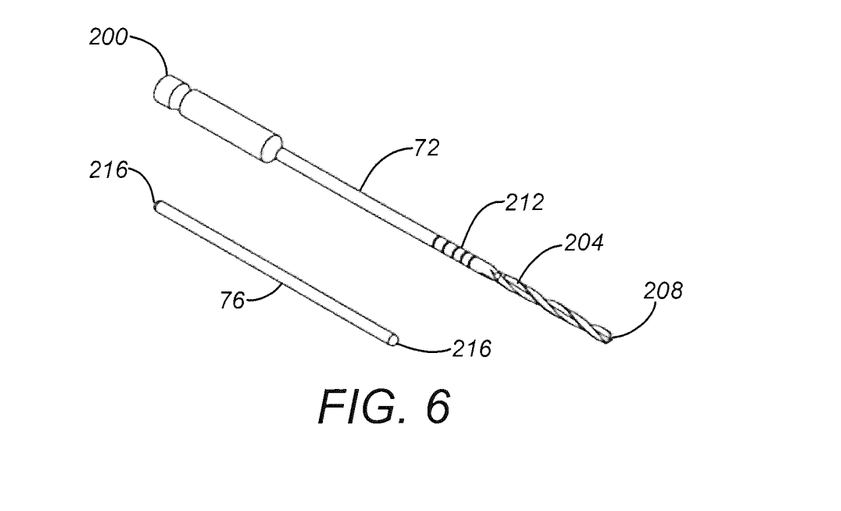
FIG. 6 illustrates an upper perspective view of an exemplary embodiment of a bone drill and a locator pin in accordance with the present disclosure.

FIG. 6 is a perspective view illustrating an exemplary embodiment of the bone drill 72 and locator pin 76 that may be included in the staple implant system 60, according to the present disclosure. The bone drill 72 is a generally elongate member configured for drilling holes in human bone. The bone drill 72 comprises a proximal shank 200 configured to be received into a drill chuck. One or more flutes 204 angulate around a circumference of the drill and they extend to a distal cutting edge 208. As will be appreciated, the one or more flutes 204 are configured to transport bone cuttings away from the distal cutting edge 208 during drilling into bone. One or more depth annuli 212 may be disposed proximal to the flutes 204. Preferably, the depth annuli 212 may assist the surgeon with drilling osteotomy holes to a desired depth.

The locator pin 76 generally comprises a small, symmetric shaft comprising rounded ends 216 and a diameter suitable to be received into the sleeves 172 of the drill guide 68. It is envisioned that the locator pin 76 and the bone drill 72 may be used in conjunction with the drill guide 68 to drill parallel osteotomy holes across a bone fusion or fixation site of a patient. For example, during a bone fusion surgery, the surgeon may hold the drill guide 68 such that the sleeves 172 are centered across the bone fusion or fixation site and then insert the bone drill 72 into a first of either of the sleeves 172 to drill a first osteotomy hole into the bone of the patient.

Upon removing the bone drill 72, the surgeon may insert the locator pin 76 through the sleeve 172 and into the newly drilled first osteotomy hole. With the locator pin 76 positioned in the first sleeve 172 and the first osteotomy hole, the surgeon may insert the bone drill 72 into a second sleeve 172 and drill a second osteotomy hole. It should be understood, therefore, that the locator pin 76, the bone drill 72, and the drill guide 68 advantageously enable the surgeon to drill osteotomy holes that are optimally positioned to receive the first and second legs 136, 140 in the distracted state of the surgical staple 116, as disclosed herein.

As will be recognized, some surgical procedures may necessitate removing a surgical staple, such as the surgical staple 116, from a bone fusion or fixation site of a patent. It is envisioned that the surgeon may lift the crown 132 away from the patient's bone surface by way of a suitable removal tool so as to create enough clearance for the surgeon to engage the grips 120, 124 between the bone and the crown 132. With the first and second grips 120, 124 suitably engaged with the crown 132, the surgeon may turn the proximal handle 104 clockwise to distally advance the driver into contact with the center of the crown 132. Upon twisting the proximal handle 104 so as to place the surgical staple 116 into the distracted configuration, the surgeon may use the staple inserter 100 to pull the first and second legs 136, 140 free of the patient's bone.

It should be understood that although the instruments comprising the staple implant system 60 have been discussed in combination with the surgical staple 116, the staple implant system 60 is not to be limited to implanting surgical staples. Rather, the instruments comprising the staple implant system 60 may be used in various capacities other than as described herein, such as, by way of non-limiting example, bending a bone fusion plate so as to tailor the plate to a specific anatomy of a patient's bone being treated. Accordingly, the instruments comprising the staple implant system 60 preferably are comprised of rigid materials suitable for bending surgical implants, such as surgical staples and bone fusion plates, as described herein. In some embodiments, the rigid materials may be comprised of metal, plastic, or a combination of the two.

Figure 7A:
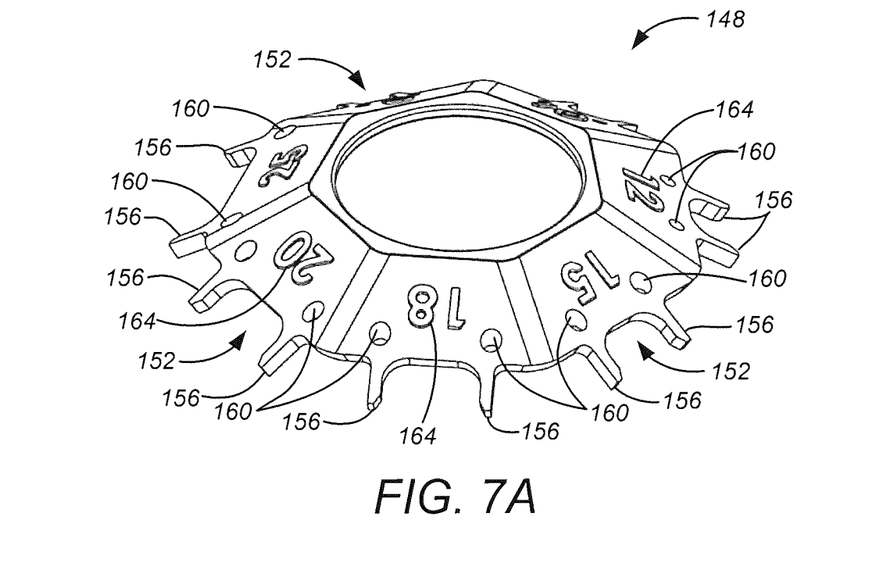
FIG. 7A illustrates a perspective view of an exemplary embodiment of a staple sizer, according to the present disclosure.
Figure 7B:
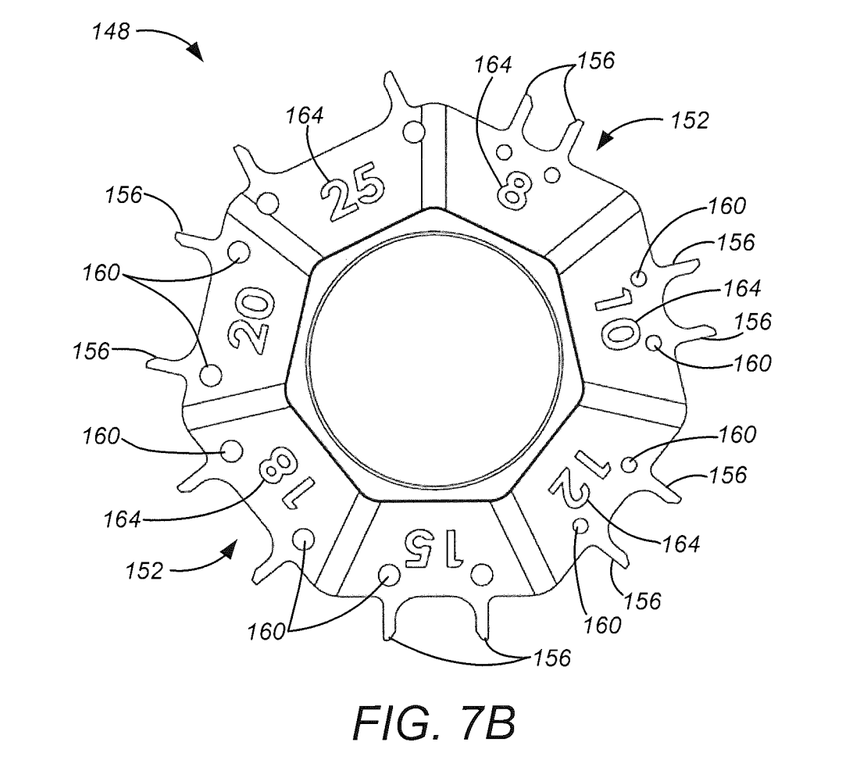
FIG. 7B illustrates a top plan view of the exemplary embodiment of the staple sizer illustrated in FIG. 7A in accordance with the present disclosure.

As disclosed above, the staple inserter 100 may be configured for use with specific sizes of surgical staples 116. To this end, one or more staple inserters 100 may be used in conjunction with a staple sizer 148, as shown in FIGS. 7A-7B. The staple sizer 148 is a generally disc-shaped member comprising a plurality of sections 152 corresponding to different sizes of surgical staples, such as the surgical staple 116. Each of the plurality of sections 152 comprises a pair of parallel protrusions 156 extending away from the center of the stable sizer 148 and disposed adjacently to a pair of holes 160. The parallel protrusions 156 correspond to the positions of the first and second legs 136, 140 in the distracted state of the surgical staple 116. The pair of holes 160 indicate the relationship between osteotomy holes suitably drilled across a bone fusion or fixation site of the patient. Each section 152 comprises a size indicator 164 that displays a size of the surgical stable 116 that, when distracted, comprises first and second legs 136, 140 that substantially match the positions of the parallel protrusions 156. Further, the first and second legs 136, 140 of a distracted surgical staple 116 may be inserted through the pair of holes 160 in an appropriate section 152 without effort.

As disclosed above, it is envisioned that the staple sizer 148 may be utilized during osteotomy to assist the surgeon in selecting an appropriately sized surgical staple 116. For example, after drilling osteotomy holes across a bone fixation site of the patient, the surgeon may compare the osteotomy holes with the parallel protrusions 156 of the staple sizer 148. Upon finding a pair of the parallel protrusions 156 that best match the osteotomy holes, the surgeon may refer to the size indicator 164 to determine an appropriately sized surgical staple 116 for implantation into the osteotomy holes of the patient. The surgeon may compare the first and second legs 136, 140 of the distracted surgical staple 116 with the holes 160 to verify the suitability of the staple for implantation into the patient. As will be appreciated, the staple sizer 148 effectively enables the surgeon to select an appropriately sized surgical staple 116, as well as the associated staple inserter 100, without being forced to unpack multiple unneeded staple implant systems 60 in an attempt to locate a desired size of the staple.

Although the staple inserter 100 has been described hereinabove in combination with the surgical staple 116, it is to be understood that the surgical staple 116 is not limited to the particular embodiment of the surgical staple described in connection with FIGS. 1-3B. As such, it is contemplated that in some embodiments, multiple teeth suitable for engaging with bone may be disposed on one or more surfaces of the surgical staple 116, such as, for example, along a backspan or crown of the staple. In the embodiment of the surgical staple 116, illustrated in FIGS. 1-3B, for example, a multiplicity of teeth 240 are disposed along an inner side of each of the legs 136, 140 of the surgical staple 116 so as to discourage movement of the staple once implanted in bone. The teeth 240 may be biased toward the crown 132 so as to facilitate inserting the staple into bone, while discouraging the staple from backing out of the bone after implantation.

Figure 8:
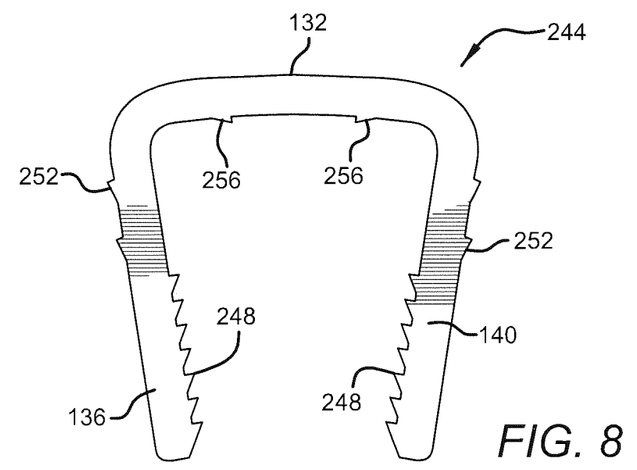
FIG. 8 illustrates a side plan view of an exemplary embodiment of a surgical staple that may be implanted into bone in accordance with the present disclosure.

FIG. 8 illustrates a side plan view of an exemplary embodiment of a surgical staple 244 that may be implanted into bone in accordance with the present disclosure. The surgical staple 244 is similar to the surgical staple 116, and thus the surgical staple 244 generally is of a variety indicated for fixation of osteotomies and joint arthrodeses of the hands and feet. In some embodiments, the surgical staple 244 may be comprised of a material that is amenable to being placed into the distracted configuration and relaxed therefrom, such as by way of the staple inserter 100. To this end, the surgical staple 244 may be comprised of a metal alloy that exhibits shape memory and superelastic properties, such as Nitinol or other similar material.

As shown in FIG. 8, multiple teeth 248 are disposed along an inner side of the first and second legs 136, 140. The teeth 248 are biased toward the crown 132, such that the teeth 248 engage with bone and prevent the staple from backing out of the bone after implantation, yet the teeth 248 offer relatively little resistance during implantation of the surgical staple 244 into the bone. Although seven of the teeth 248 are shown disposed along each of the legs 136, 140, it is contemplated that more or less than seven teeth 248 may be incorporated along the legs 136, 140 in various other embodiments of the surgical staple 244. In addition to the teeth 248, multiple exterior teeth 252 may be disposed along the first and second legs 136, 140. As shown in FIG. 8, the surgical staple 244 includes two exterior teeth 252 disposed on an outside of each of the legs 136, 140, near the crown 132. The exterior teeth 252 cooperate with the teeth 248 to engage the bone and prevent movement of the surgical staple 244 after being implanted into the bone.

Figure 9:
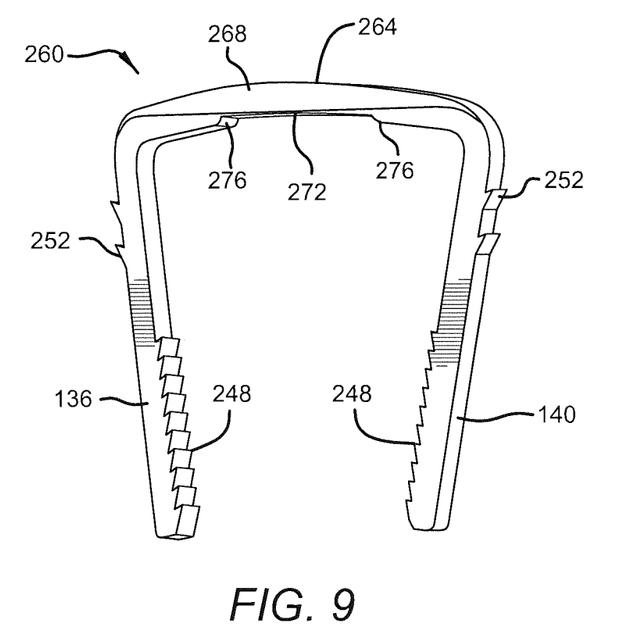
FIG. 9 illustrates a perspective view of an exemplary embodiment of a surgical staple comprised of a crown that includes an upper reinforced portion and a valley underneath the reinforced portion.

Moreover, teeth similar to the teeth 248, 252 are not limited to being disposed along the first and second legs 136, 140, but rather teeth, as well as various other advantageous structures, may be incorporated into the crown 132, without limitation. For example, in the embodiment illustrated in FIG. 8, two teeth 256 are disposed on the lower surface of the crown 132. The teeth 256 are biased toward a centerline of the crown 132 so as to engage with bone and prevent lateral movement of the crown 132 along the surface of the bone. In another example, FIG. 9 illustrates an embodiment of a surgical staple 260 comprised of a crown 264 that includes an upper reinforced portion 268 and a valley 272 underneath the reinforced portion. In the illustrated embodiment, the valley 272 is centrally disposed along the lower surface of the crown 264 and bordered by edges 276. As will be appreciated, the edges 276 are configured to engage with bone and prevent lateral movement of the crown 264 along the surface of the bone once the surgical staple 260 is implanted. The reinforced portion 268 imparts structural integrity to the surgical staple 260 in compensation for the presence of the valley 264.

Figure 10A:
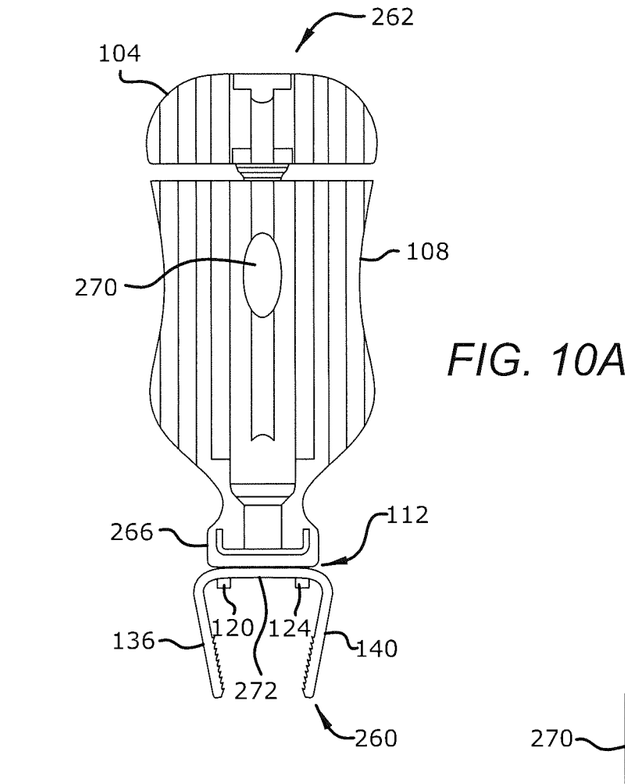
FIG. 10A illustrates a front plan view of the surgical staple of FIG. 9 loaded within a distal force applicator of an exemplary embodiment of a staple inserter that may be used to implant the staple in a patient's bone.
Figure 10B:
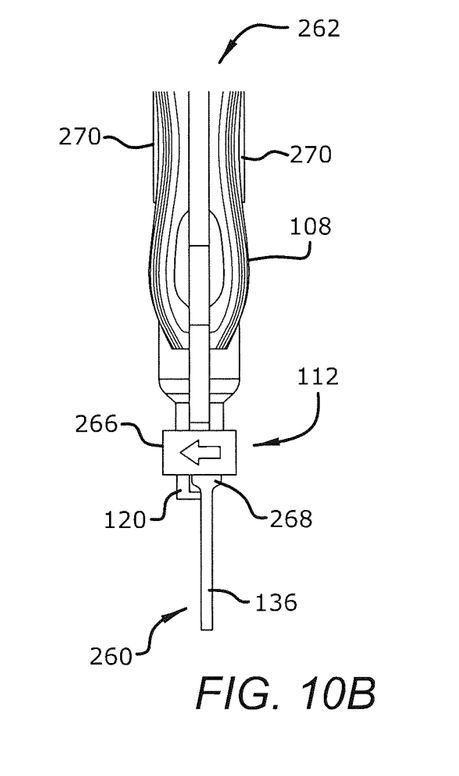
FIG. 10B illustrates a side plan view of the surgical staple of FIG. 9 loaded within the distal force applicator of the staple inserter illustrated in FIG. 10A.

FIGS. 10A-10B illustrate the surgical staple 260 loaded within the distal force applicator 112 of an exemplary embodiment of a staple inserter 262 that may be used to implant the staple in a patient's bone, as described herein. The staple inserter 262 is substantially similar to the staple inserter 100, discussed with respect to FIGS. 1-3B. The staple inserter 262 of FIG. 10A comprises a proximal handle 104, a body 108, as well as the distal force applicator 112. Further, the distal force applicator 112 comprises a first grip 120 and a second grip 124. A driver (not shown) is centered between the first and second grips 120, 124, as disclosed hereinabove. The first and second grips 120, 124 are configured to cooperate so as to support the crown 264 of the surgical staple 260 when the driver is placed into forcible contact with the center of the upper reinforced portion 268 of the crown 264. The first and second grips 120, 124 contact opposite ends of an underside of the crown 264 with the valley 272 therebetween. The forces on the crown 264 due to the driver and the grips 120, 124 operate to retain the surgical staple 260 within the distal force applicator 112, thereby facilitating implanting the staple into the patient. As shown in FIG. 10A, the first and second grips 120, 124 engage the surgical staple 260 on the same side of the crown 264. A direction indicator 266 disposed near the distal force applicator 112 is configured to inform a practitioner of a preferred direction to insert the surgical staple 260 into the distal force applicator so as to engage the crown 264 with the first and second grips 120, 124. The direction indicator 266 may be embossed, engraved, printed, or otherwise disposed on the staple inserter 262 so as to be directly visible to the practitioner.

The first and second grips 120, 124 may have a separation distance comparable with the length of the crown 264. Thus, as illustrated in FIGS. 10A-10B, the first grip 120 may be positioned between the first leg 136 and the edge 276 of the valley 272, and the second grip 124 may be positioned between the second leg 140 and the edge 276 of the valley 272. It will be appreciated, therefore, that the distal force applicator 112 of the staple inserter 262 may be used with a variety of differently-sized surgical staples 260 so long as the valley 272 may be disposed between the grips 120, 124. As such, in some embodiments, the staple inserter 262 may include a size indicator 270 that informs the practitioner of an overall size, or a group of sizes, of the surgical staple 260 that may be implanted into bone by way of the stapler inserter 262. It is contemplated, that the size indicator 270 may be embossed, engraved, printed, or otherwise disposed on the staple inserter 262 so as to be directly visible to the practitioner.

Figure 11:
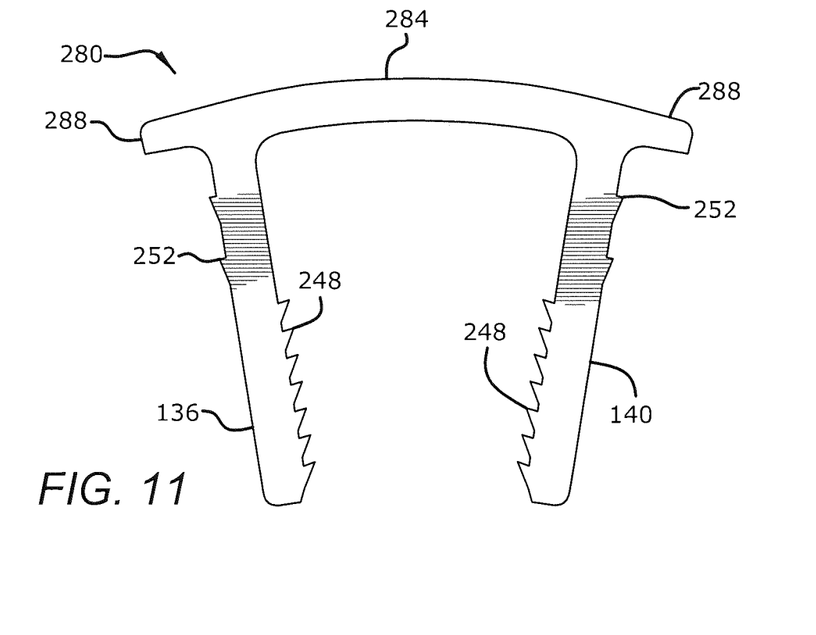
FIG. 11 illustrates a side plan view of an exemplary embodiment of a surgical staple that is indicated for fixation of osteotomies and joint arthrodeses of the hands and feet.

FIG. 11 illustrates a side plan view of an exemplary embodiment of a surgical staple 280 that is indicated for fixation of osteotomies and joint arthrodeses of the hands and feet. The surgical staple 280 is similar to the surgical staple 244, illustrated in FIG. 8, and thus the surgical staple 280 is comprised of a first leg 136 and a second leg 140 that both include inner teeth 248 and exterior teeth 252, as described hereinabove. Unlike the surgical staple 244, however, the surgical staple 280 is comprised of a crown 284 that is includes a wing portion 288 that extends beyond each of the legs 136, 140. Disposed at opposite ends of the crown 284, the wing portions 288 cooperate with the teeth 248, 252, as well as with the center portion of the crown 284, to fixate the surgical staple 280 once implanted in bone.

It should be understood that the wing portions 288 are not to be limited to being incorporated into the illustrated embodiment of the surgical staple 280, shown in FIG. 11, but rather the wing portions 288 may be practiced in combination with any of various features disclosed hereinabove in connection with the surgical staples 244, 260. For example, in some embodiments, the wing portions 288 may be incorporated into the crown 132 comprising the surgical staple 244. Thus, the wing portions 288 and the teeth 252 may cooperate to fixate the surgical staple 244 once implanted into bone. Further, in some embodiments, the wing portions 288 may be combined with the upper reinforced portion 268 and the valley 272 to fixate the surgical staple 260 implanted into bone. It is further contemplated, therefore, that in some embodiments, the wing portions 288 may be practiced in absence of any or all of the teeth 248, 252, the reinforced portion 268, and the valley 272, without limitation.

Figure 11A:
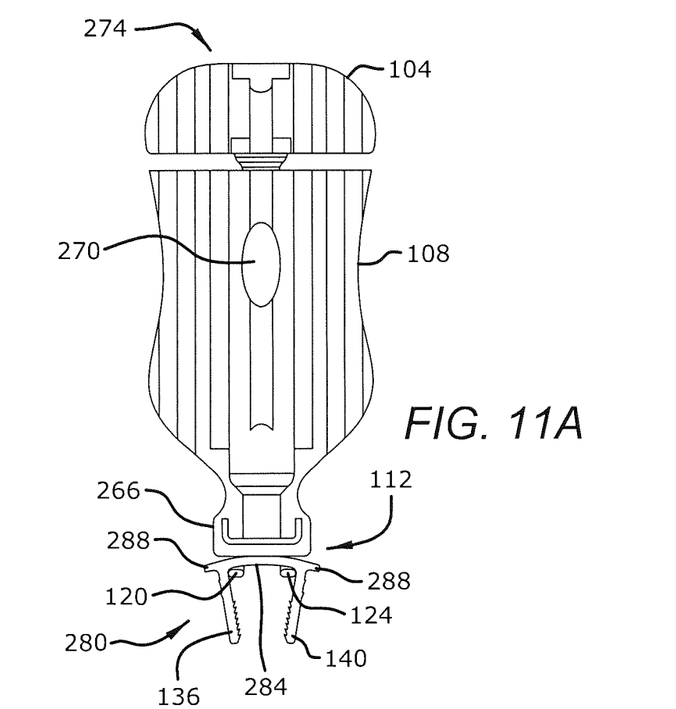
FIG. 11A illustrates a front plan view of the surgical staple of FIG. 11 loaded into the distal force applicator of an exemplary embodiment of a staple inserter that may be used to implant the staple in a patient's bone.

As will be appreciated, the surgical staple 280 may be implanted into a patient's bone by way of a staple inserter, as described herein. For example, FIG. 11A illustrates a front plan view of the surgical staple 280 loaded into the distal force applicator 112 of an exemplary embodiment of a staple inserter 274. As will be recognized, the staple inserter 274 is substantially the same as the staple inserter 262, illustrated in FIGS. 10A-10B, with the exception that the staple inserter 274 is configured for implanting differently sized staples than the staple inserter 262 of FIGS. 10A-10B. As such, the size indicator 270 disposed on the staple inserter 274 indicates the sizes of the surgical staple 280 that may be implanted by way of the staple inserter 274.

Figure 11B:
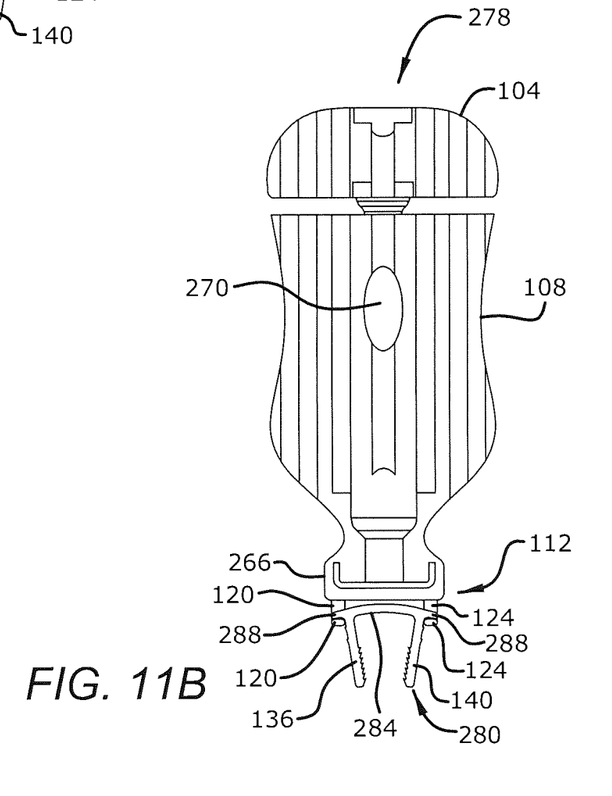
FIG. 11B illustrates a front plan view of the surgical staple of FIG. 11 loaded into an exemplary embodiment of a staple inserter that engages the staple by way of wing portions comprising the surgical staple.

In the embodiment illustrated in FIG. 11A, the surgical staple 280 is loaded into the distal force applicator 112 of the staple inserter 274 such that the first and second grips 120, 124 are engaged with the crown 284 between the first leg 136 and the second leg 140. In some embodiments, however, the wing portions 288 may be received by the first and second grips 120, 124 for the purpose of distracting the staple as disclosed herein. For example, FIG. 11B illustrates a front plan view of the surgical staple 280 loaded into an exemplary embodiment of a staple inserter 278 that engages the staple 280 by way of the wing portions 288. The first and second grips 120, 124 cooperate to support the wing portions 288 of the crown 284 when the driver (not shown) is placed into forcible contact with the center of the crown 284. The force on the crown 284 due to the driver and the force on the wing portions 288 due to the grips 120, 124 operate to retain the surgical staple 280 within the distal force applicator 112, and thus facilitate implanting the staple into the patient. As will be appreciated, engaging the wing portions 288 on opposite ends of the crown 284 advantageously prevents the surgical staple 280 from becoming dislodged from the distal forced applicator 112 during distracting the staple or implantation into the patient.

Figure 12:
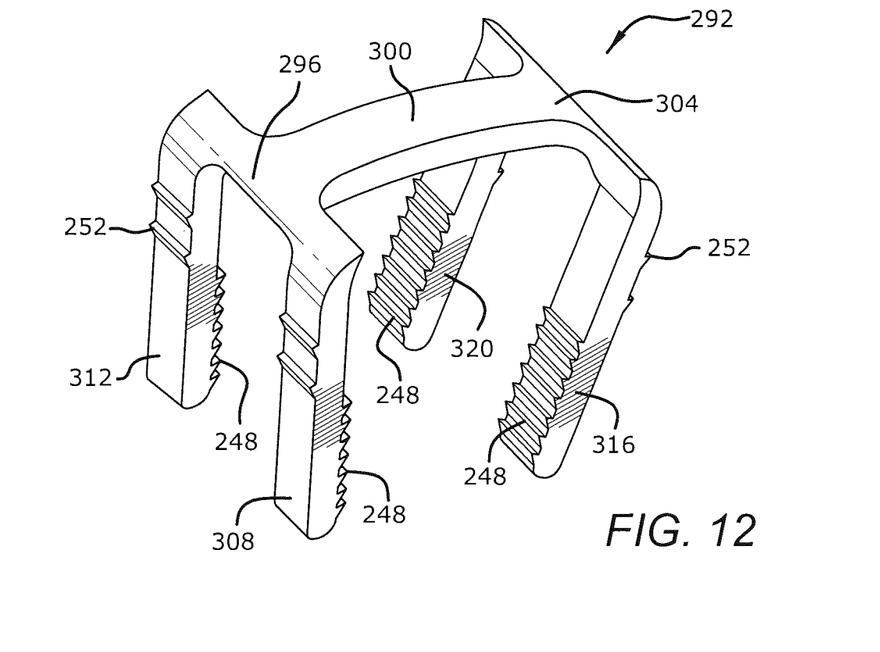
FIG. 12 illustrates an upper perspective view of an exemplary embodiment of a surgical staple that may be implanted into bone in accordance with the present disclosure.

FIG. 12 illustrates an upper perspective view of an exemplary embodiment of a surgical staple 292 that may be implanted into bone in accordance with the present disclosure. The surgical staple 292 generally is indicated for fixation of osteotomies and joint arthrodeses of the hands and feet. In some embodiments, the surgical staple 292 may be comprised of a material that is amenable to being placed into the distracted configuration and relaxed therefrom, such as by way of any of the staple inserters 100, 262, 274. Similar to the surgical staples discussed with respect to FIGS. 1-11, the surgical staple 292 may be comprised of a metal alloy that exhibits shape memory and superelastic properties, such as Nitinol or other similar material.

As will be appreciated, the surgical staple 292 is similar to the surgical staple 244, illustrated in FIG. 8, with the exception that the surgical staple 292 is comprised of four legs in lieu of solely the first and second legs 136, 140 comprising the surgical staple 244. As shown in FIG. 12, the surgical staple 292 is comprised of a first transverse portion 296 disposed at one end of a crown 300 and a second transverse portion 304 disposed at an opposite end of the crown 300. A first leg 308 and a second leg 312 extend downward and parallelly from opposite ends of the first transverse portion 296. Similarly, a third leg 316 and a fourth leg 320 extend downward and parallelly from opposing ends of the second transverse portion 304. The first and second legs 308, 312 angle respectively toward the third and fourth legs 316, 320, giving the surgical staple 292 a resemblance of two of the surgical staples 244 coupled together in parallel. Thus, the first leg 308 and the third leg 316 cooperate similarly to the legs 136, 140 of a first surgical staple 244, and the second leg 312 and the fourth leg 320 cooperate similarly to the legs 136, 140 of a second surgical staple 244. As such, the surgical staple 292 is particularly well suited for implantation into four holes that are drilled in bone across a bone fusion site.

Figure 12A:
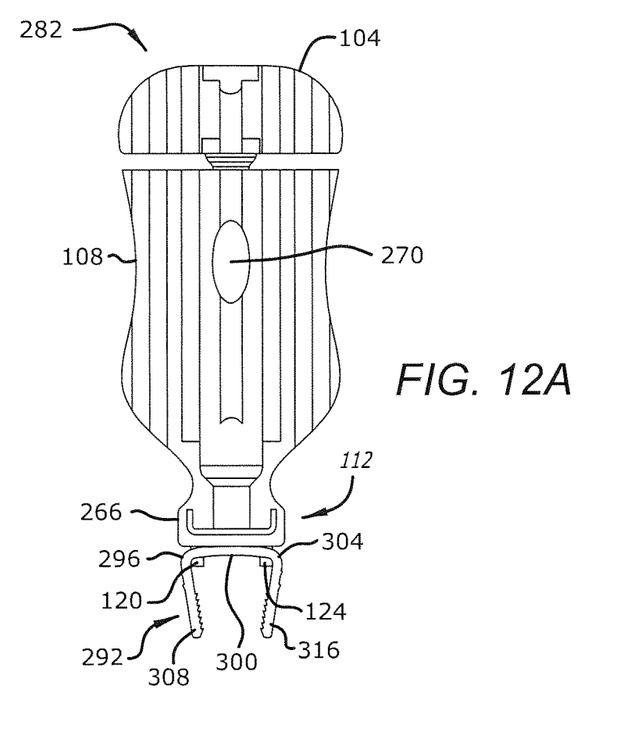
FIG. 12A illustrates a front plan view of the surgical staple of FIG. 12 engaged with an exemplary embodiment of a staple inserter that may be used to implant the staple in a patient's bone.
Figure 12B:
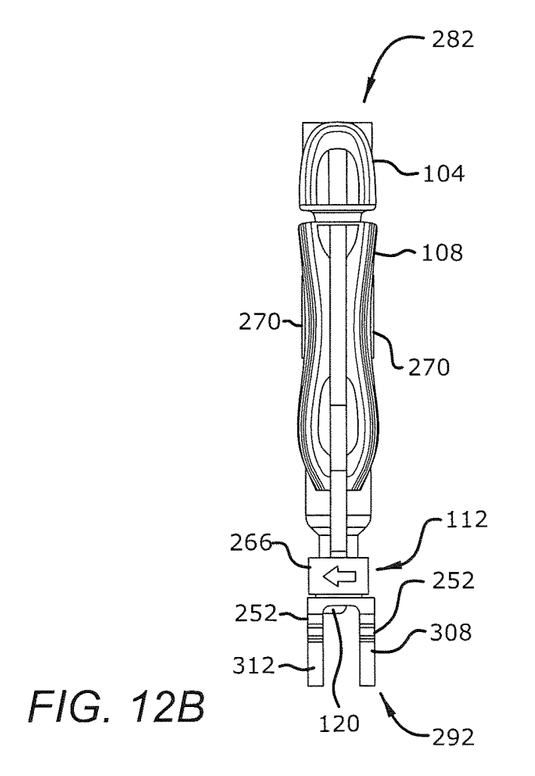
FIG. 12B illustrates a side plan view of the surgical staple of FIG. 12 engaged with the exemplary embodiment of the staple inserter shown in FIG. 12A.

It is contemplated that although the surgical staple 292 is comprised of four legs, the surgical staple may be advantageously implanted into a patient's bone by way of a staple inserter. As such, FIGS. 12A-12B illustrate the surgical staple 292 engaged with an exemplary embodiment of a staple inserter 282, according to the present disclosure. The staple inserter 282 is substantially identical to the staple inserter 262, illustrated in FIGS. 10A-10B, with the exception that the staple inserter 282 is configured for implanting differently sized staples than the staple inserter 262 of FIGS. 10A-10B. Similar to the staple inserter 262, the staple inserter 282 includes a size indicator 270 that indicates the sizes of the surgical staple 292 that may be implanted by way of the staple inserter 282. The size indicator 270 may be embossed, engraved, printed, or otherwise disposed on the staple inserter 282 so as to be directly visible to the practitioner.

As shown in FIGS. 12A-12B, the first and second grips 120, 124 comprising the staple inserter 282 are configured to cooperatively support the crown 300 of the surgical staple 292 when a driver (not shown) is placed into forcible contact with the center of the crown 300. The first and second grips 120, 124 contact opposite ends of the underside of the crown 300 with the first and second transverse portions 296, 304 respectively disposed outside the grips 120, 124. Further, the first and second grips 120, 124 engage the surgical staple 292 on the same side of the crown 300. As disclosed herein, a direction indicator 266 may be disposed near the distal force applicator 112 and configured to inform the practitioner of a preferred direction to insert the surgical staple 292 into the distal force applicator so as to engage the crown 300 with the first and second grips 120, 124.

The first and second grips 120, 124 may have a separation distance comparable with the length of the crown 300. Thus, the first grip 120 may engage the end of the crown 300 abutting the first transverse portion 296, and the second grip 124 may engage the end of the crown 300 abutting the second transverse portion 304. It should be recognized, however, that symmetry of the surgical staple 292 ensures that the first grip 120 may be equivalently engaged with the end of the crown 300 that abuts the second transverse portion 304, and the second grip 124 may be engaged with the end of the crown 300 that abuts the first transverse portion 296. Further, it should be understood that the staple inserter 282 may be used with a variety of differently sized surgical staples 292 so long as opposite ends of the crown 300 may be suitably engaged with the grips 120, 124. To this end, the size indicator 270 preferably is configured to indicate the overall size, or group of sizes, of the surgical staple 292 that may be advantageously implanted by way of the staple inserter 282.

It is contemplated that any of the legs 308, 312, 316, 320 may be practiced in combination with any of the various features disclosed hereinabove in connection with the surgical staples 244, 260, 280, without limitation. For example, in the illustrated embodiment of FIG. 12, each of the legs 308, 312, 316, 320 includes multiple inner teeth 248 and a pair of exterior teeth 252, as described herein. The teeth 248 disposed on the first and second legs 308, 312 are oriented toward the teeth 248 disposed on the third and fourth legs 316, 320. Thus, once the surgical staple 292 is implanted into bone and allowed to relax from the distracted configuration, the legs 308, 312, 316, 320 cooperatively compress the bones to be fused as the staple attempts to return to the initial configuration illustrated in FIG. 12. The teeth 248 engage with the bone and ensure that the implanted surgical staple 292 remains fixated. The exterior teeth 252 operate similarly to the teeth 248, engaging with the bone and fixating the surgical staple 292, as disclosed herein.

It is contemplated that the surgical staple 292 may be practiced in combination with any of various features disclosed in connection with the surgical staples 244, 260, 280, without limitation. For example, in some embodiments, the wing portions 288 may be incorporated into the crown 300. In some embodiments, wing portions 288 may be coupled with opposite ends of each of the first and second transverse portions 296, 304. It is envisioned, therefore, that the wing portions 288 may cooperate with the teeth 248, 252 to fixate the surgical staple 292 once implanted into bone. Further, in some embodiments, the wing portions 288 may be incorporated into the crown 300 in combination with an upper reinforced portion 268 and a valley 272, as discussed in connection with FIG. 9, to fixate the surgical staple 292 implanted in bone. Moreover, in some embodiments, the wing portions 288 may be incorporated into the surgical staple 292 in lieu of any or all of the teeth 248, 252, the reinforced portion 268, and the valley 272, without limitation.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A sterile staple implant system for use during a surgery, comprising:
   a staple inserter; comprising a distal force applicator, and a first grip and a second grip;
   wherein the staple inserter is stored with a surgical staple in a relaxed configuration, and engaged with the first and second grip using a staple retention clip;
   wherein the surgical staple comprises a crown coupled with a first leg at a first end and coupled with a second leg at a second end;
   the first leg and second leg comprising a multiplicity of teeth disposed along an inner side of each of the legs and biased toward the crown that facilitate inserting the staple into bone and discourage the staple from backing out of the bone after implantation; and wherein
   the staple inserter comprises:
   a proximal handle comprising a directional indicator and mechanically coupled to a driver, wherein the proximal handle is configured to:
   advance a shaft and move the driver distally towards the crown in response to rotating the proximal handle in a first direction, thereby distracting the surgical staple; and
   relax the surgical staple in response to rotating the proximal handle in a second direction;
   the staple retention clip configured to keep the crown fixedly engaged with the first and second grip of the staple inserter;
   wherein the staple retention clip retains the surgical staple in a relaxed state during sterilization, packaging, and shipping, and prevents the crown from becoming dislodged from the distal force applicator;
   wherein the first grip of the staple inserter is positioned with respect to the first leg of the surgical staple, and wherein a second grip of the staple inserter is positioned with respect to the second leg of the surgical staple;
   wherein the first and second grips contact opposite ends of an underside of the crown;
   a group of complementary surgery-specific instruments that are packaged in a sterile state comprising a tamp configured to push the first leg and second leg into a plurality of osteotomy holes, the staple inserter, the surgical staple, a bone drill, a drill guide, and a locator pin; and
   an instrument tray configured to preserve the instruments in the sterile state and provide easy access to the instruments during the surgery,
   wherein once the surgical staple is in the distracted configuration, the first and second legs of the surgical staple are configured to be slid into parallel holes across a fixation site of a patient.

2. The system of claim 1, wherein the staple retention clip is configured to be removed from the staple inserter during or after distracting the surgical staple prior to being implanted into a bone of a patient.

3. The system of claim 1, wherein the group of instruments further comprises any of various surgical tools, such as drill sizers, forceps, staple removal tools, temporary pins, drill depth stops, fusion bone plates, bone plate fasteners, compression screws, and the like.

4. The system of claim 1, wherein the plurality of teeth are configured to engage with a bone.

5. The system of claim 4, wherein the surgical staple includes wing portions disposed at opposite ends of the crown and extending beyond the first leg and the second leg, the wing portions being configured to cooperate with at least the plurality of teeth to fixate the surgical staple once implanted in the bone.

6. The system of claim 5, wherein the wing portions are configured to receive a first grip and a second grip comprising the staple inserter for placing the surgical staple into a distracted configuration suitable for implantation into a bone.

7. The system of claim 1, wherein the crown includes an upper reinforced portion and a valley disposed underneath the reinforced portion and bordered by edges, the crown being configured to receive a first grip and a second grip comprising the staple inserter for placing the surgical staple into a distracted configuration suitable for implantation into a bone.

8. The system of claim 1, wherein the surgical staple comprises a crown coupled with a first transverse portion at a first end and coupled with a second transverse portion at a second end, a first leg and a second leg extending downward and parallelly from opposite ends of the first transverse portion, a third leg and a fourth leg extending downward and parallelly from opposing ends of the second transverse portion.

9. The system of claim 8, wherein a plurality of teeth are disposed on each of the first leg, the second leg, the third leg, and the fourth leg and oriented toward a centerline of the crown.

10. The system of claim 8, wherein the staple inserter includes a first grip and a second grip that share a separation distance comparable with the length of the crown.

11. The system of claim 10, wherein the first grip is configured to engage the crown adjacent to the first transverse portion, and the second grip is configured to engage the crown adjacent to the second transverse portion.

12. The system of claim 10, wherein the first grip and the second grip are configured to engage wing portions disposed at opposite ends of the crown and extending beyond the first transverse portion and the second transverse portion, the wing portions being configured to receive the first grip and the second grip for placing the surgical staple into a distracted configuration suitable for implantation into a bone.

* * * * *